US008953007B2

(12) United States Patent
Ozawa

(10) Patent No.: US 8,953,007 B2
(45) Date of Patent: Feb. 10, 2015

(54) OPTICAL SCANNER AND IMAGE FORMING APPARATUS

(71) Applicant: KYOCERA Document Solutions Inc., Osaka (JP)

(72) Inventor: Hiroki Ozawa, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/228,667

(22) Filed: Mar. 28, 2014

(65) Prior Publication Data

US 2014/0300682 A1 Oct. 9, 2014

(30) Foreign Application Priority Data

Apr. 5, 2013 (JP) ................................ 2013-079121

(51) Int. Cl.

*G01D 15/14* (2006.01)
*B41J 2/41* (2006.01)
*B41J 2/435* (2006.01)
*B41J 2/47* (2006.01)
*G03G 21/16* (2006.01)

(52) U.S. Cl.

CPC .. *B41J 2/47* (2013.01); *B41J 2/471* (2013.01); *G03G 21/1666* (2013.01)
USPC ............ 347/225; 347/224; 347/152; 347/263

(58) Field of Classification Search

USPC .................................. 347/224, 263, 225, 152
See application file for complete search history.

(56) References Cited

U.S. PATENT DOCUMENTS

| | | | | |
|---|---|---|---|---|
| 2,030,858 | A * | 2/1936 | Dobson | 312/284 |
| 7,830,545 | B2 * | 11/2010 | Mamiya | 358/1.7 |
| 2006/0082639 | A1 * | 4/2006 | Kojima | 347/224 |
| 2012/0251158 | A1 * | 10/2012 | Ishidate | 399/98 |

FOREIGN PATENT DOCUMENTS

| | | |
|---|---|---|
| JP | 2003-177344 | 6/2003 |
| JP | 2006-076250 | 3/2006 |
| JP | 2008-020592 | 1/2008 |
| JP | 2011-150005 | 8/2011 |

* cited by examiner

*Primary Examiner* — Sarah Al Hashimi

(74) *Attorney, Agent, or Firm* — Wenderoth, Lind & Ponack, L.L.P.

(57) ABSTRACT

An optical scanner includes a housing and a cover member attached to the housing. A tubular pin attachment portion is installed in a side portion of the housing. A tapping screw pin is inserted into the pin attachment portion when the housing is fastened and fixed to a fastening target with the tapping screw pin. A pin head accommodating portion formed into a tubular shape to extend in a coaxial relationship with the pin attachment portion is installed in a side portion of the cover member. The pin head accommodating portion is configured to accommodate a head portion of the tapping screw pin inserted into the pin attachment portion.

14 Claims, 5 Drawing Sheets

1

OPTICAL SCANNER AND IMAGE FORMING APPARATUS

CROSS-REFERENCE TO RELATED APPLICATION

THIS APPLICATION IS BASED UPON AND CLAIMS THE BENEFIT OF PRIORITY FROM JAPANESE PATENT APPLICATION(S) NO. 2013-079121 FILED ON Apr. 5, 2013, THE ENTIRE CONTENTS OF WHICH ARE INCORPORATED HEREIN BY REFERENCE.

FIELD OF THE INVENTION

The technology of the present disclosure relates to an optical scanner for use in, e.g., an image forming apparatus such as a copier, a printer or the like.

There is known an optical scanner installed in, e.g., an image forming apparatus such as a copier, a printer or the like and configured to scan the light of a light source on a photoreceptor.

In this optical scanner, the light of a light source is reflected by a polygon mirror and is incident on a photoreceptor drum of an image forming apparatus through an imaging lens. Since the polygon mirror is rotationally driven, the reflected light of the polygon mirror passed through the imaging lens scans the surface of the photoreceptor drum. Thus, an electrostatic latent image is formed on the surface of the rotating photoreceptor drum.

SUMMARY

An optical scanner according to one aspect of the present disclosure includes a housing configured to accommodate optical scanning parts and a cover member attached to the housing. A tubular pin attachment portion is installed in a side portion of the housing. A screw pin is inserted into the pin attachment portion when the housing is fastened and fixed to a fastening target by the screw pin. A pin head accommodating portion is installed in a side portion of the cover member. The pin head accommodating portion is formed into a tubular shape to extend in a coaxial relationship with the pin attachment portion. The pin head accommodating portion is configured to accommodate a head portion of the screw pin inserted into the pin attachment portion.

An image forming apparatus according to another aspect of the present disclosure includes the optical scanner.

A method of fixing a housing configured to accommodate optical scanning parts and a cover member attached to the housing to a fastening target by a screw pin according to another aspect of the present disclosure includes a preparation step of forming a tubular pin attachment portion in a side portion of the housing as well as forming a pin head accommodating portion which extends in a coaxial relationship with the pin attachment portion in a side portion of the cover member; a pin insertion step of inserting the screw pin into the pin attachment portion in the side portion of the housing; an attachment step of attaching the cover member to the housing so that a head portion of the screw pin is accommodated in the pin head accommodating portion of the cover member; and a fastening step of fastening the screw pin to the fastening target by inserting a tool into the tubular pin head accommodating portion.

DETAILED DESCRIPTION

An embodiment of the present disclosure will now be described in detail with reference to the drawings. The technology of the present disclosure is not limited to the embodiment described herein below.

Figure 1:
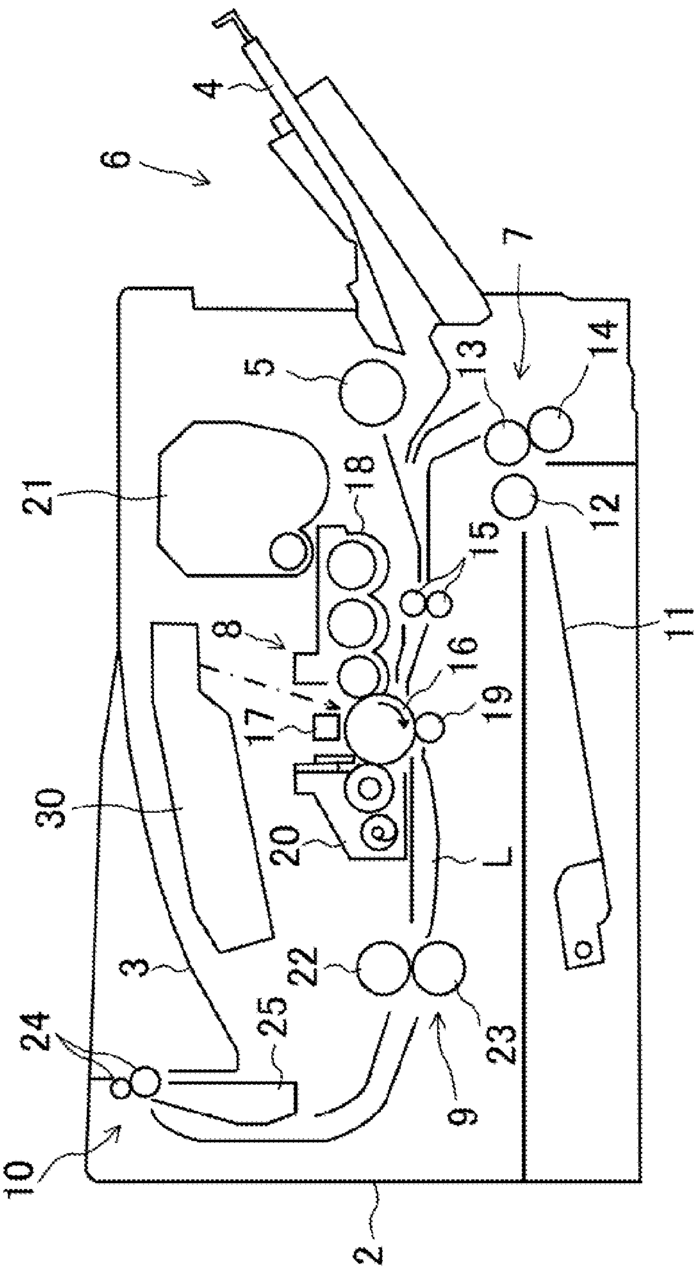
FIG. 1 is a sectional view showing a schematic configuration of an image forming apparatus.

A laser printer 1 of the present embodiment constitutes an image forming apparatus according to the present embodiment. As shown in FIG. 1, the laser printer 1 includes a box-shaped printer body 2, a manual insertion paper feeding unit 6, a cassette paper feeding unit 7, an image forming unit 8, a fixing unit 9 and a paper discharge unit 10. The laser printer is configured such that, while conveying a paper along a conveying path L within the printer body 2, the laser printer 1 forms an image on the paper based on image data transmitted from a terminal not shown or the like.

The manual insertion paper feeding unit 6 includes a manual insertion tray 4 provided in one side portion of the printer body 2 so that it can be opened and closed, and a manual-insertion-purpose paper feeding roller 5 rotatably installed within the printer body 2.

The cassette paper feeding unit 7 is installed in the bottom portion of the printer body 2. The cassette paper feeding unit 7 includes a paper feeding cassette 11 for retaining a plurality of papers overlapping one above another, a pick roller 12 for taking out, one by one, the papers held within the paper feeding cassette 11, and a feed roller 13 and a retard roller 14 for separating the taken-out papers one by one and sending the papers to the conveying path L.

The image forming unit 8 is installed above the cassette paper feeding unit 7 within the printer body 2. The image forming unit 8 includes a photosensitive drum 16 as an image carrier, a charging unit 17, a developing unit 18, a transfer roller 19, a cleaning unit 20, a laser scanning unit (LSU) 30, and a toner hopper 21. The photosensitive drum 16 is rotatably installed within the printer body 2. The charging unit 17, the developing unit 18, the transfer roller 19 and the cleaning unit 20 are disposed around the photosensitive drum 16. The laser scanning unit 30 and the toner hopper 21 are disposed above the photosensitive drum 16. Thus, the image forming unit 8 is configured to form an image on the paper supplied from the manual insertion paper feeding unit 6 or the cassette paper feeding unit 7. The laser scanning unit 30 constitutes an optical scanner.

A pair of register rollers 15 for temporarily keeping the paper on standby and then supplying the paper to the image forming unit 8 at a predetermined timing is installed in the conveying path L.

The fixing unit 9 is disposed at one side of the image forming unit 8. The fixing unit 9 includes a fixing roller 22 and a pressing roller 23 which are pressed against each other and are rotated together. The fixing unit 9 is configured to fix a toner image, which is transferred to the paper by the image forming unit 8, to the paper.

The paper discharge unit 10 is installed above the fixing unit 9. The paper discharge unit 10 includes a paper discharge tray 3, a pair of paper discharge rollers 24 for conveying the paper to the paper discharge tray 3 and a plurality of conveyance guide ribs 25 for guiding the paper to the paper discharge rollers 24. The paper discharge tray 3 is formed in the upper portion of the printer body 2 to have a concave shape.

If the laser printer 1 receives image data, the photosensitive drum 16 of the image forming unit 8 is rotationally driven and the surface of the photosensitive drum 16 is electrically charged by the charging unit 17.

Based on the image data, laser light is emitted from the laser scanning unit 30 toward the photosensitive drum 16. An electrostatic latent image is formed on the surface of the photosensitive drum 16 by the irradiation of the laser light. The electrostatic latent image formed on the photosensitive drum 16 is developed by the developing unit 18 and is visualized as a toner image.

Thereafter, the paper is pressed against the surface of the photosensitive drum 16 by the transfer roller 19. Thus, the toner image of the photosensitive drum 16 is transferred to the paper. The paper to which the toner image is transferred is heated and pressed by the fixing roller 22 and the pressing roller 23 in the fixing unit 9. As a result, the toner image is fixed to the paper.

Figure 2:
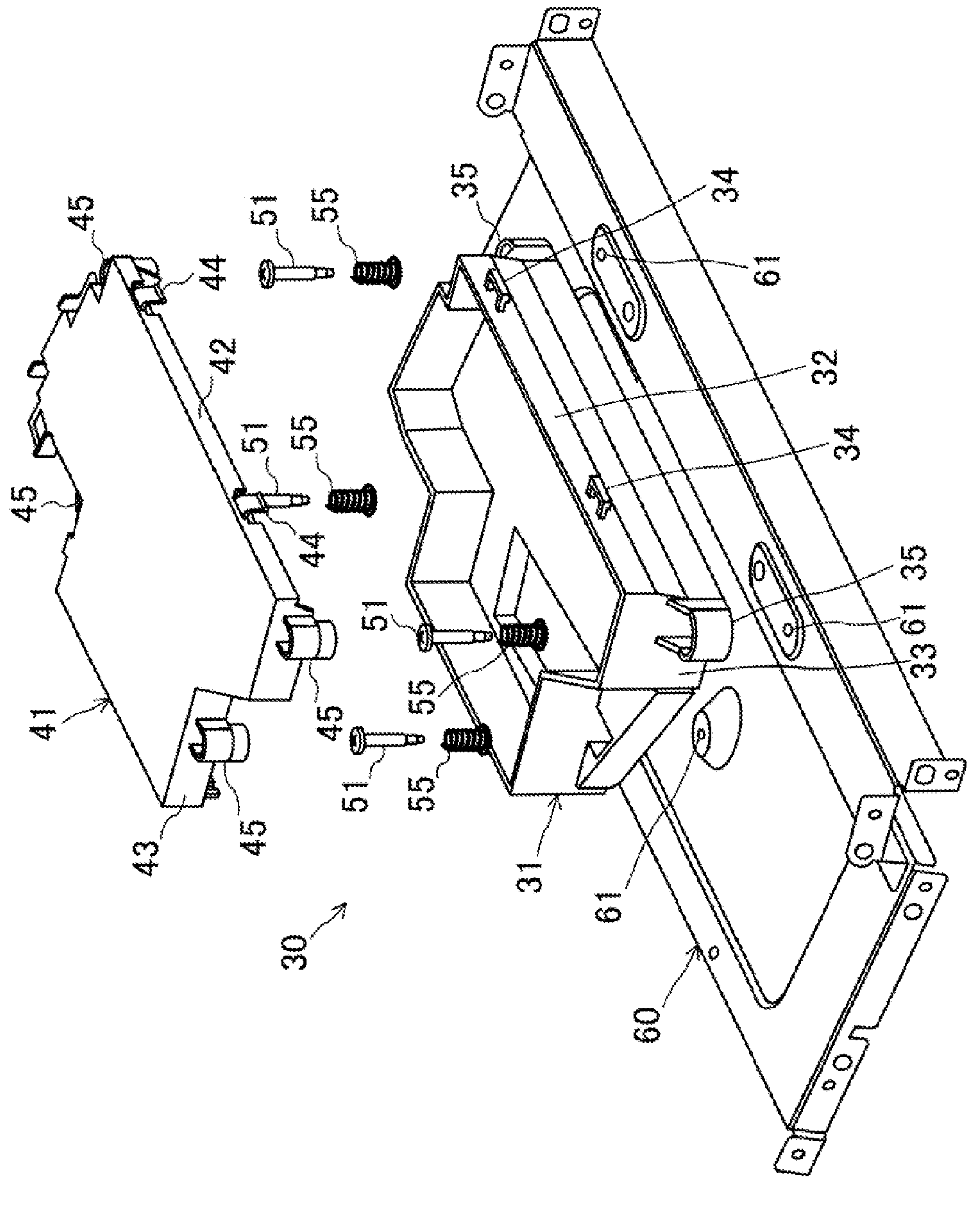
FIG. 2 is a perspective view showing schematic configurations of an optical scanner and a frame.

As shown in FIG. 2, the laser scanning unit 30 includes a housing 31 and a cover member 41 attached to the housing 31. Optical scanning parts to be described later are accommodated within the housing 31.

The housing 31 is configured by a flat box-shaped member whose ceiling portion remains open. The housing 31 is formed of a resin material whose strength is increased by, e.g., glass fibers. The open ceiling portion of the housing 31 is closed by the cover member 41. More specifically, a claw 44 is installed in a side plate 42 of the cover member 41, and an engaging portion 34 engaging with the claw 44 of the cover member 41 is installed in a side plate 32 of the housing 31. The claw 44 is fitted into the engaging portion 34, whereby the cover member 41 is attached to the housing 31. The cover member 41 is made of, e.g., a black resin material.

While not shown, the housing 31 accommodates optical scanning parts such as a polygon mirror, a polygon motor, an imaging lens and the like. The polygon mirror is a rotating polygon mirror rotationally driven by the polygon motor. While not shown, a light source (e.g., a laser light source) is installed in a side portion of the housing 31.

In the laser scanning unit 30, the laser light emitted from the light source is collected on a reflection surface of the polygon mirror. The light collected on the polygon mirror is reflected by the reflection surface of the polygon mirror and is incident on the imaging lens as scanning light. The scanning light incident on the imaging lens is emitted toward the external photosensitive drum 16 through an opening (not shown) of the housing 31. Thus, the scanning light is focused on the surface of the photosensitive drum 16. The scanning light focused on the surface of the photosensitive drum 16 scans the surface of the photosensitive drum 16 in a main scanning direction by virtue of the rotation of the polygon mirror and scans the surface of the photosensitive drum 16 in an auxiliary scanning direction by virtue of the rotation of the photosensitive drum 16, thereby forming an electrostatic latent image on the surface of the photosensitive drum 16.

As shown in FIG. 2, the laser scanning unit 30 is attached to a frame 60 installed in the printer body 2. More specifically, the housing 31 is fastened and fixed to the frame 60, whereby the laser scanning unit 30 is attached to the frame 60.

Figure 3:
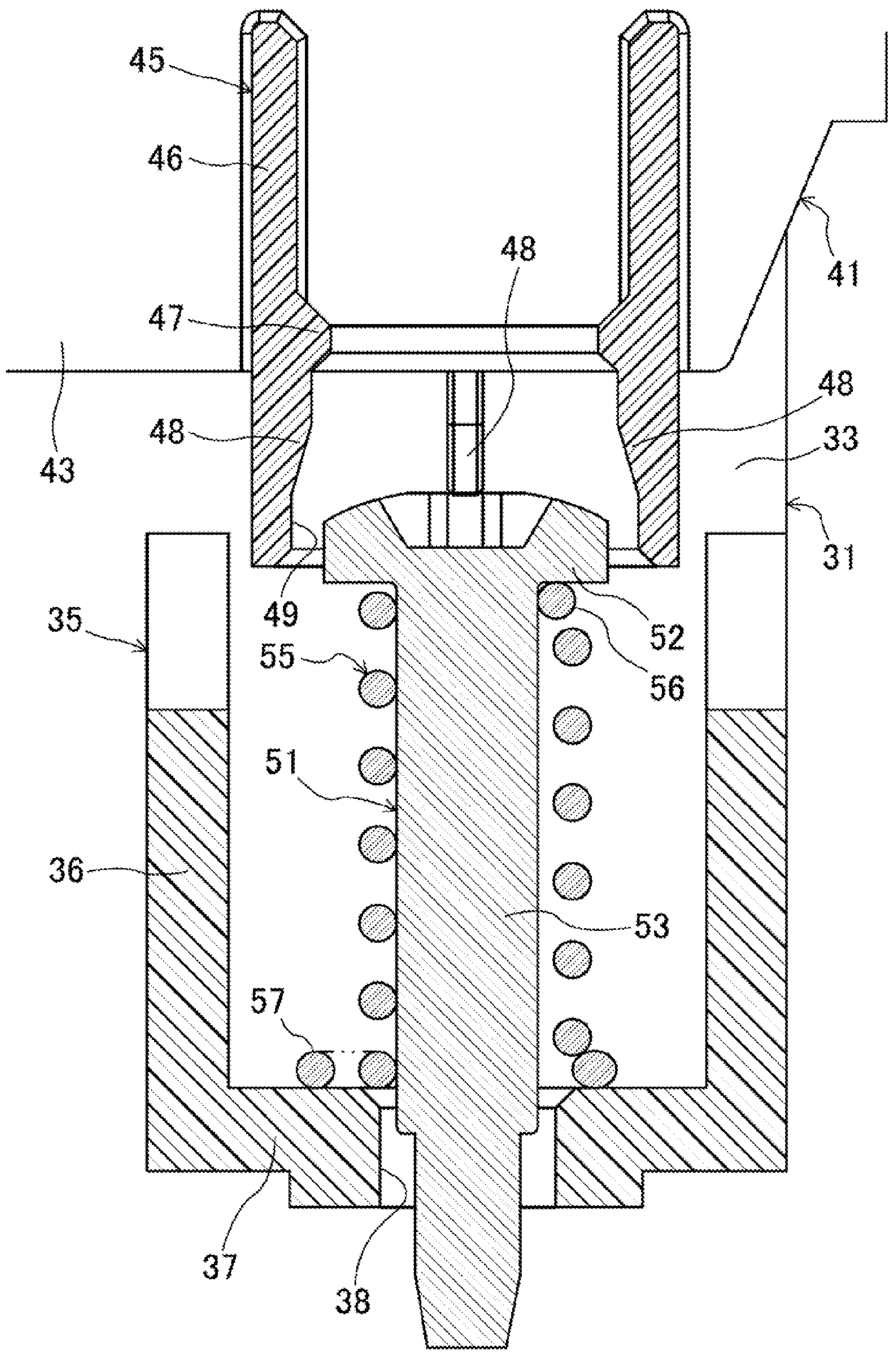
FIG. 3 is a sectional view showing a mounting structure of the optical scanner which is not yet placed on the frame.
Figure 4:
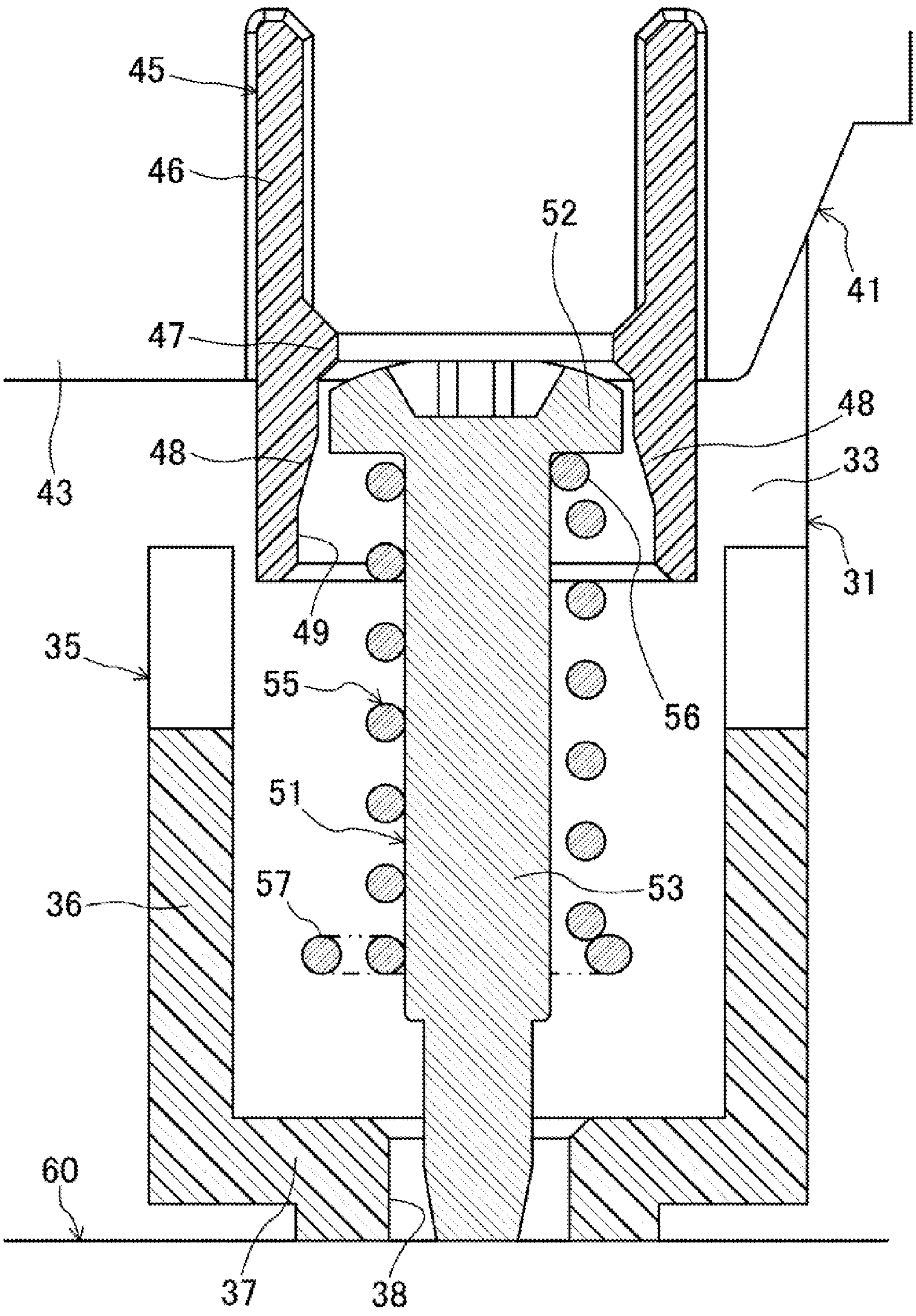
FIG. 4 is a view similar to FIG. 3 but showing the mounting structure of the optical scanner which is just placed on the frame.
Figure 5:
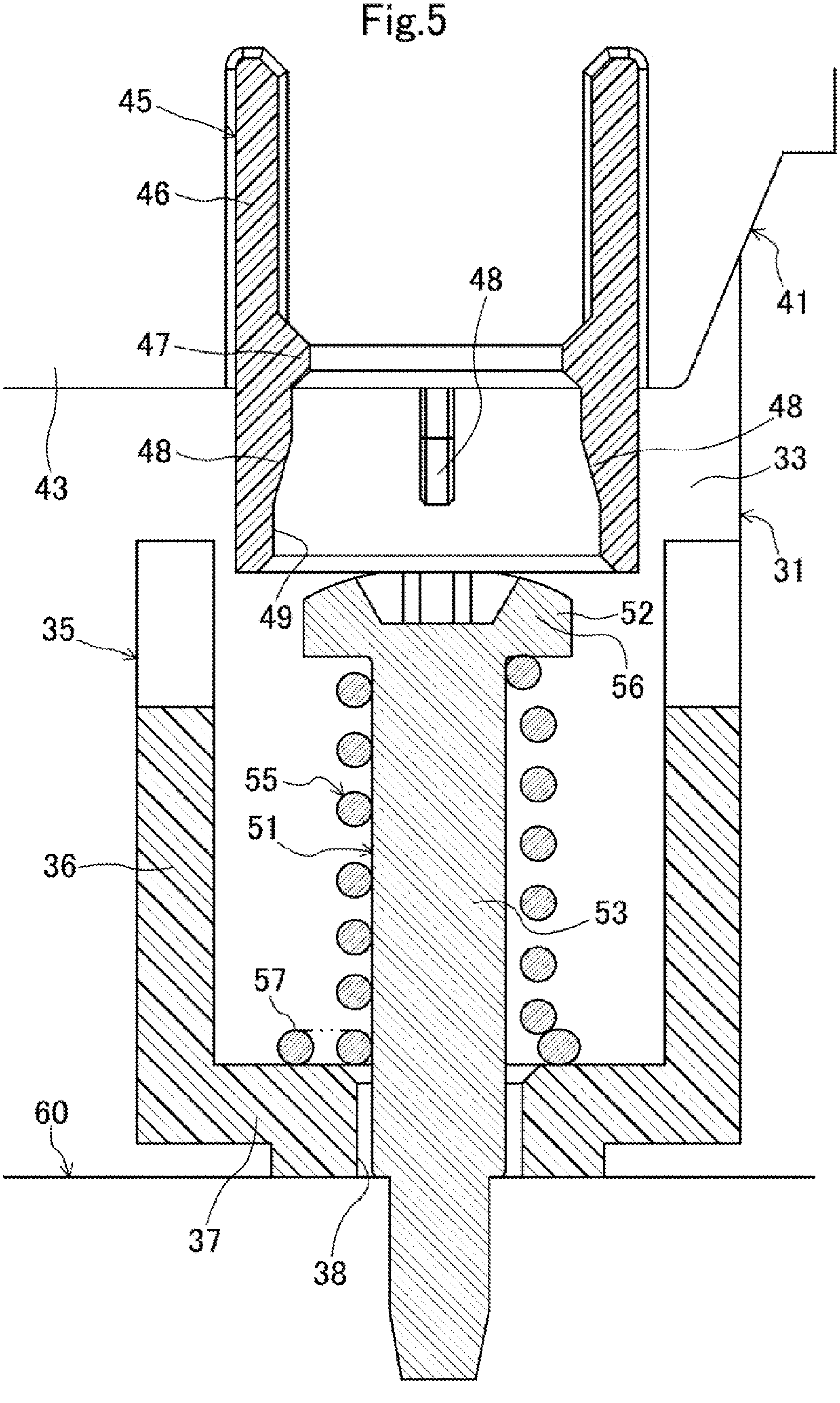
FIG. 5 is a view similar to FIG. 3 but showing the mounting structure of the optical scanner which is fastened and fixed to the frame.

A plurality of pin attachment portions 35 is installed in the side plate 32 (the side portion) of the housing 31. Each of the pin attachment portions 35 is formed into a tubular shape. When the housing 31 is fastened and fixed to the frame as a fastening target with tapping screw pins 51, the tapping screw pins 51 are inserted into the respective pin attachment portions 35. As shown in FIGS. 3 to 5, each of the pin attachment portions 35 includes a tubular body 36 having a bottom plate 37 formed at the lower end thereof. A through hole 38 through which each of the tapping screw pins 51 penetrates is formed in the bottom plate 37. A coil spring 55 is fitted to a shaft portion 53 of each of the tapping screw pins 51. Each of the tapping screw pins 51 fixes the housing 31 through the coil spring 55. The natural length of the coil spring (55) is larger than the length of a shaft portion of the screw pin (51). And, the housing 31 is fixed by the elastic force of the coil spring 55. A pilot hole 61 for each of the tapping screw pins 51 is formed in the frame 60. the outer diameter of a seat surface portion of the coil spring (55) is larger than the outer diameter of a portion excluding the seat surface portion of the coil spring (55).

A tubular pin head accommodating portion 45 capable of accommodating a head portion 52 of each of the tapping screw pins 51 inserted into each of the pin attachment portions 35 is installed in a side plate 43 of the cover member 41. The pin head accommodating portion 45 is formed into a tubular shape in a coaxial relationship with each of the pin attachment portions 35 and is positioned above each of the pin attachment portions 35.

As shown in FIGS. 3 to 5, the pin head accommodating portion 45 includes a tubular body 46 smaller in size than the tubular body 36 of each of the pin attachment portions 35. That is, the outer diameter of the pin head accommodating portion 45 is smaller than the inner diameter of the pin attachment portion 35. The head portion 52 of each of the tapping screw pins 51 is accommodated within the tubular body 46. The inner diameter of a portion which accommodates the head portion 52 of each of the tapping screw pins 51 in the pin head accommodating portion 45 has a dimension corresponding to the outer diameter of the head portion 52 of each of the screw pins 51 (a dimension which is the same as the outer diameter of the head portion 52 or slightly larger than that). This prevents falling of the tapping screw pins 51. A band-shaped projection 47 is installed on the inner surface of the tubular body 46 (namely, the inner surface of the pin head accommodating portion 45) over the entire circumference thereof. The projection 47 restrains the head portion 52 of each of the tapping screw pins 51 accommodated within the tubular body 46 from moving upward (namely, moving away from each of the pin attachment portions 35).

Slant portions 48 are installed below the projection 47 on the inner surface of the tubular body 46. The slant portions 48 are inclined inward as they extend upward (namely, away from each of the pin attachment portions 35). In the present embodiment, the slant portions 48 are installed partially (at four points) along a circumferential direction.

In the present embodiment, the laser scanning unit 30 is configured such that the cover member 41 is mounted to the housing 31 after inserting the tapping screw pins 51 and the coil springs 55 into the pin attachment portions 35 of the housing 31. In a state in which the cover member 41 is mounted to the housing 31, as shown in FIG. 3, the tapping screw pins 51 are supported by the coil springs 55 and are hard to fall down. Since the head portions 52 of the tapping screw pins 51 are partially inserted into (accommodated within) the pin head accommodating portions 45 of the cover member 41, the tapping screw pins 51 are kept in a standing state without falling down. The tip ends of the shaft portions 53 of the tapping screw pins 51 protrude from the through holes 38.

Next, if the laser scanning unit 30 is placed on the frame 60 in order to attach the laser scanning unit 30, in which the cover member 41 is mounted to the housing 31, to the frame 60, the tapping screw pins 51 are pushed upward. As a result, the head portion 52 of each of the tapping screw pins is inserted into and accommodated within the pin head accommodating portion 45 of the cover member 41 (see FIG. 4). In this state, each of the tapping screw pins 51 can be fastened by inserting a screwdriver into the pin head accommodating portion 45 from above. If the fastening is finished, the head portion 52 of each of the tapping screw pins 51 comes out from the pin head accommodating portion 45. The housing 31 is fixed to the frame 60 by the elastic force of the coil spring 55 (see FIG. 5). In FIG. 5, the coil spring is shown in the same state as available before the fastening of each of the tapping screw pins 51. In reality, however, the coil spring 55 positioned between the head portion 52 of each of the tapping screw pins 51 and the bottom plate 37 of each of the pin attachment portions 35 is compressed as each of the tapping screw pins 51 is fastened.

When fastening the tapping screw pins 51, the head portion 52 of each of the tapping screw pins 51 is accommodated within the pin head accommodating portion 45. Therefore, the outer periphery of each of the tapping screw pins 51 is constrained by the inner wall of the tubular body 46. Thus, it is possible to restrain each of the tapping screw pins 51 from tottering during the fastening work. Accordingly, the fastening workability gets improved.

In the present embodiment, the projection 47 is installed on the inner surface of the pin head accommodating portion 45 (on the inner surface of the tubular body 46). Therefore, in the pre-fastening state (e.g., during the transportation of products) shown in FIG. 3, it is possible to prevent each of the tapping screw pins 51 from being removed out of the pin head accommodating portion 45. Furthermore, when fastening each of the tapping screw pins with a magnet-type screwdriver, even if the screwdriver is mistakenly removed out of the pin head accommodating portion 45 during the fastening work, it is possible to reliably prevent the tapping screw pin 51 from being stuck to the screwdriver and being removed out of the pin head accommodating portion 45 together with the screwdriver. As a result, the fastening workability gets further improved.

In the present embodiment, the slant portions 48 are installed on the inner surface of the pin head accommodating portion 45 (on the inner surface of the tubular body 46). Therefore, when the laser scanning unit 30 is placed on the frame 60 and when the head portion 52 of each of the tapping screw pins 51 is accommodated within the pin head accommodating portion 45, the head portion 52 of each of the tapping screw pins 51 moves along the slant portions 48. Thus, it is possible for the pin head accommodating portion 45 to reliably guide the head portion 52 of each of the tapping screw pins 51 toward the axis of the tubular body 46 (namely, the center of the tubular body 46 when seen in an axial direction) (see FIG. 4). That is to say, in the present embodiment, the slant portions 48 serves as a guide for guiding the head portion 52 to a specified easy-to-fasten position when the head portion 52 of each of the tapping screw pins 51 is accommodated within the pin head accommodating portion 45. As a result, the fastening workability gets further improved.

In order to assure that the head portion 52 of each of the tapping screw pins 51 is reliably inserted into the pin head accommodating portion 45 when the laser scanning unit 30 is placed on the frame 60, it is preferred that the opening 49 of the pin head accommodating portion 45 is sufficiently larger in size than the head portion 52 of each of the tapping screw pins 51. Even if the size of the opening 49 of the pin head accommodating portion 45 is made large in this manner, the head portion 52 of each of the tapping screw pins 51 inserted into the pin head accommodating portion 45 can be reliably guided to a specified position by the slant portions 48.

In the present embodiment, the coil spring 55 is fitted to shaft portion 53 of each of the tapping screw pins 51. Thus, the housing 31 can be fixed to the frame 60 by the elastic force of the coil spring 55. Therefore, as compared with a case where a housing is directly fixed by tapping screw pins without using a coil spring, it is possible to reduce the fixing force of the housing 31 to some extent. Accordingly, when the housing 31 is thermally expanded (thermally deformed) by the heat generated in the optical scanning parts such as a polygon motor and the like, it is possible to release the thermal expansion (thermal deformation) just as much as the clearance between each of the tapping screw pins 51 and the through hole 38. This makes it possible to suppress the thermal expansion (thermal deformation) of the housing 31. If the housing 31 is thermally expanded (thermally deformed), there is a fear that the optical scanning accuracy of the laser scanning unit 30 may decrease. In the present embodiment, it is however possible to alleviate the decrease in the optical scanning accuracy of the laser scanning unit 30.

In the coil spring 55 of the present embodiment, the outer diameter of the seat surface portion 57 thereof is larger than the outer diameter of the remaining portion. Thus, it is possible to reliably suppress the falling of the coil spring 55 before and during the fastening work. This makes it possible to further suppress the falling or tottering of the tapping screw pins 51 before and during the fastening work.

In the present embodiment, the upper end portion 56 of the coil spring 55 is bent and press-fitted to each of the tapping screw pins 51. Thus, it is possible for the coil spring 55 to reliably support each of the tapping screw pins 51. This makes it possible to further suppress the falling or tottering of the tapping screw pins 51 before and during the fastening work.

In the aforementioned embodiment, the projection 47 is installed over the entire circumference of the pin head accommodating portion 45. However, the present disclosure is not limited thereto. It may be possible to employ any other configuration that can restrain upward movement of the head portion 52 of each of the tapping screw pins 51.

In the aforementioned embodiment, the slant portions 48 of the pin head accommodating portion 45 are partially installed along the circumferential direction. Alternatively, a slant portion may be installed over the entire circumference of the pin head accommodating portion 45.

In the aforementioned embodiment, the tapping screw pins 51 are used. However, the present disclosure is not limited thereto. It may be possible to perform the fastening through the use of other kinds of screw pins.

In the present embodiment, the laser scanning unit 30 has been described as one example of the optical scanner. However, the optical scanner is not limited thereto but may be other optical scanner in which the optical scanning parts are accommodated within the housing 31.

In the present embodiment, the laser printer 1 has been described as one example of the image forming apparatus. However, the image forming apparatus is not limited thereto but may be other image forming device such as a copier, a scanner, a multifunction peripheral or the like.

As described above, the technology of the present disclosure is useful in an optical scanner for use in an image forming apparatus such as a copier, printer or the like and an image forming apparatus provided with the optical scanner.

What is claimed is:

1. An optical scanner, comprising:

a housing configured to accommodate optical scanning parts; and a cover member attached to the housing, wherein a tubular pin attachment portion, into which a screw pin is inserted when the housing is fastened and fixed to a fastening target by the screw pin, is installed in a side portion of the housing, a pin head accommodating portion formed into a tubular shape to extend in a coaxial relationship with the tubular pin attachment portion and capable of accommodating a head portion of the screw pin inserted into the tubular pin attachment portion is installed in a side portion of the cover member, and a projection which restrains the head portion of the screw pin accommodated within the pin head accommodating portion from moving away from the tubular pin attachment portion is installed on an inner surface of the pin head accommodating portion.

2. The optical scanner of claim 1, wherein an outer diameter of the pin head accommodating portion is smaller than an inner diameter of the tubular pin attachment portion.

3. The optical scanner of claim 1, wherein an inner diameter of a portion which accommodates the head portion of the screw pin in the pin head accommodating portion has a dimension corresponding to the outer diameter of the head portion of the screw pin.

4. The optical scanner of claim 1, wherein a coil spring is fitted to a shaft portion of the screw pin.

5. The optical scanner of claim 4, wherein a natural length of the coil spring is larger than a length of a shaft portion of the screw pin.

6. The optical scanner of claim 4, wherein an outer diameter of a seat surface portion of the coil spring is larger than an outer diameter of a portion excluding the seat surface portion of the coil spring.

7. An image forming apparatus provided with the optical scanner of claim 1.

8. An optical scanner, comprising:

a housing configured to accommodate optical scanning parts; and a cover member attached to the housing, wherein a tubular pin attachment portion, into which a screw pin is inserted when the housing is fastened and fixed to a fastening target by the screw pin, is installed in a side portion of the housing, a pin head accommodating portion formed into a tubular shape to extend in a coaxial relationship with the tubular pin attachment portion and capable of accommodating a head portion of the screw pin inserted into the tubular pin attachment portion is installed in a side portion of the cover member, and a slant portion inclined inward as the slant portion extends away from the tubular pin attachment portion is installed on an inner surface of the pin head accommodating portion over an entire or partial circumference of the pin head accommodating portion.

9. The optical scanner of claim 8, wherein an outer diameter of the pin head accommodating portion is smaller than an inner diameter of the tubular pin attachment portion.

10. The optical scanner of claim 8, wherein an inner diameter of a portion which accommodates the head portion of the screw pin in the pin head accommodating portion has a dimension corresponding to an outer diameter of the head portion of the screw pin.

11. The optical scanner of claim 8, wherein a coil spring is fitted to a shaft portion of the screw pin.

12. The optical scanner of claim 11, wherein a natural length of the coil spring is larger than a length of a shaft portion of the screw pin.

13. The optical scanner of claim 11, wherein an outer diameter of a seat surface portion of the coil spring is larger than an outer diameter of a portion excluding the seat surface portion of the coil spring.

14. An image forming apparatus provided with the optical scanner of claim 8.

* * * * *